(12) United States Patent
Kim

(10) Patent No.: US 9,593,622 B2
(45) Date of Patent: Mar. 14, 2017

(54) COMBUSTION SYSTEM, NOZZLE FOR PRECHAMBER ASSEMBLY, AND METHOD OF MAKING SAME

(71) Applicant: Caterpillar Inc., Peoria, IL (US)

(72) Inventor: Charlie Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 81 days.

(21) Appl. No.: 14/617,408

(22) Filed: Feb. 9, 2015

(65) Prior Publication Data

US 2016/0230646 A1 Aug. 11, 2016

(51) Int. Cl.
*F02B 19/00* (2006.01)
*F02B 19/18* (2006.01)
*F02B 19/12* (2006.01)

(52) U.S. Cl.
CPC .............. *F02B 19/18* (2013.01); *F02B 19/12* (2013.01)

(58) Field of Classification Search
CPC .. F02B 19/00; F02B 19/1004; F02B 19/1009; F02B 19/18; F02B 19/16
See application file for complete search history.

(56) References Cited

U.S. PATENT DOCUMENTS

| | | | | |
|---|---|---|---|---|
| 2,148,505 A | * | 2/1939 | Rosen | F02B 19/14 123/275 |
| 2,292,409 A | * | 8/1942 | Steward | F02B 19/1004 123/169 R |
| 2,322,606 A | * | 6/1943 | Ward | F02B 23/00 123/261 |
| 2,716,970 A | * | 9/1955 | King | F02F 1/40 123/41.73 |
| 2,739,579 A | * | 3/1956 | Ware | F02F 1/16 123/41.31 |
| 3,769,948 A | * | 11/1973 | Feichtinger | F02F 1/4214 123/188.14 |
| 4,221,195 A | | 9/1980 | Hafele et al. | |

(Continued)

FOREIGN PATENT DOCUMENTS

EP 2700796 A1 2/2014
JP 2007-198244 A 8/2007

(Continued)

*Primary Examiner* — Hieu T Vo
*Assistant Examiner* — Sherman Manley
(74) *Attorney, Agent, or Firm* — Leydig, Voit & Mayer, LTD.

(57) ABSTRACT

A nozzle for a prechamber assembly of an engine includes a hollow nozzle body having an outer surface, defining first and second outer openings, and an inner surface, defining an interior chamber and first and second inner openings. The nozzle body defines first and second orifices in communication with the interior chamber. The first orifice extends in a first orifice configuration between the first outer opening and inner opening and defines a first entry path projection extending from the first inner opening into the interior chamber. The second orifice extends in a second orifice configuration between the second outer opening and inner opening and defines a second entry path projection extending from the second inner opening into the interior chamber. The first and second entry path projections intersect at an impingement region in the interior chamber, which is radially offset from a central longitudinal axis of the nozzle.

15 Claims, 4 Drawing Sheets

(56) References Cited

U.S. PATENT DOCUMENTS

| | | | |
|---|---|---|---|
| 4,426,966 A * | 1/1984 | Huther | F02B 19/14 |
| | | | 123/254 |
| 5,024,193 A * | 6/1991 | Graze, Jr. | F02D 41/0027 |
| | | | 123/259 |
| 5,105,780 A * | 4/1992 | Richardson | H01T 13/54 |
| | | | 123/169 PA |
| 5,222,993 A * | 6/1993 | Crane | F02B 19/12 |
| | | | 123/256 |
| 5,533,476 A * | 7/1996 | Anderson | F02B 19/1009 |
| | | | 123/267 |
| 5,662,082 A * | 9/1997 | Black | F02B 19/1009 |
| | | | 123/254 |
| 5,799,637 A * | 9/1998 | Cifuni | H01T 13/54 |
| | | | 123/169 PA |
| 5,924,402 A | 7/1999 | Regueiro | |
| 5,947,076 A * | 9/1999 | Srinivasan | F02B 19/12 |
| | | | 123/256 |
| 6,019,081 A * | 2/2000 | Divecha | F02B 19/12 |
| | | | 123/254 |
| 6,575,192 B1 * | 6/2003 | Shaffer | F02B 19/12 |
| | | | 137/514.5 |
| 6,694,944 B2 | 2/2004 | Agama et al. | |
| 6,739,289 B2 | 5/2004 | Hiltner et al. | |
| 6,854,439 B2 | 2/2005 | Regueiro | |
| 6,883,468 B2 | 4/2005 | Lehman | |
| 6,928,964 B2 * | 8/2005 | Obermayer | F01P 3/16 |
| | | | 123/41.82 R |
| 7,066,137 B1 * | 6/2006 | Dawson | F02B 19/12 |
| | | | 123/266 |
| 7,100,567 B1 | 9/2006 | Bailey et al. | |
| 7,104,245 B2 * | 9/2006 | Robinet | H01T 13/54 |
| | | | 123/254 |
| 7,216,623 B2 * | 5/2007 | Teraji | F02B 19/12 |
| | | | 123/253 |
| 7,398,743 B2 | 7/2008 | Fiveland | |
| 7,438,043 B2 * | 10/2008 | Shiraishi | F02B 19/12 |
| | | | 123/260 |
| 7,513,234 B1 * | 4/2009 | Baldwin | H01T 13/26 |
| | | | 123/169 EA |
| 7,770,552 B2 * | 8/2010 | Schultz | F02B 19/12 |
| | | | 123/143 B |
| 8,074,620 B2 * | 12/2011 | Filipek | F02B 23/0657 |
| | | | 123/143 B |
| 8,104,444 B2 | 1/2012 | Schultz | |
| 8,839,762 B1 | 9/2014 | Chiera et al. | |
| 2003/0213461 A1 * | 11/2003 | Regueiro | F02B 19/08 |
| | | | 123/262 |
| 2005/0000484 A1 | 1/2005 | Schultz et al. | |
| 2005/0211217 A1 | 9/2005 | Boley et al. | |
| 2006/0096571 A1 * | 5/2006 | Tourteaux | F02B 17/005 |
| | | | 123/266 |
| 2006/0219210 A1 * | 10/2006 | Bailey | F02B 19/06 |
| | | | 123/259 |
| 2007/0236122 A1 | 10/2007 | Borror | |
| 2008/0296412 A1 | 12/2008 | Gibson et al. | |
| 2010/0132660 A1 * | 6/2010 | Nerheim | F02B 19/1014 |
| | | | 123/260 |
| 2010/0146954 A1 * | 6/2010 | Sloss | F01N 3/2889 |
| | | | 60/320 |
| 2010/0326400 A1 | 12/2010 | Hayes, Jr. | |
| 2011/0146618 A1 * | 6/2011 | LaPointe | F02B 19/12 |
| | | | 123/266 |
| 2013/0055986 A1 * | 3/2013 | Tozzi | F02B 19/12 |
| | | | 123/254 |
| 2013/0139784 A1 * | 6/2013 | Pierz | F02B 19/16 |
| | | | 123/254 |
| 2013/0160734 A1 | 6/2013 | Redtenbacher et al. | |
| 2013/0228231 A1 * | 9/2013 | Nagel | F01N 3/2066 |
| | | | 137/334 |
| 2014/0196686 A1 | 7/2014 | Coldren et al. | |
| 2014/0261298 A1 * | 9/2014 | Sasidharan | F02B 19/18 |
| | | | 123/275 |

FOREIGN PATENT DOCUMENTS

| | | |
|---|---|---|
| WO | WO 2009/109694 A2 | 9/2009 |
| WO | WO 2013/096979 A1 | 7/2013 |
| WO | WO 2014/039915 A1 | 3/2014 |
| WO | 2016057557 A1 | 4/2016 |

* cited by examiner

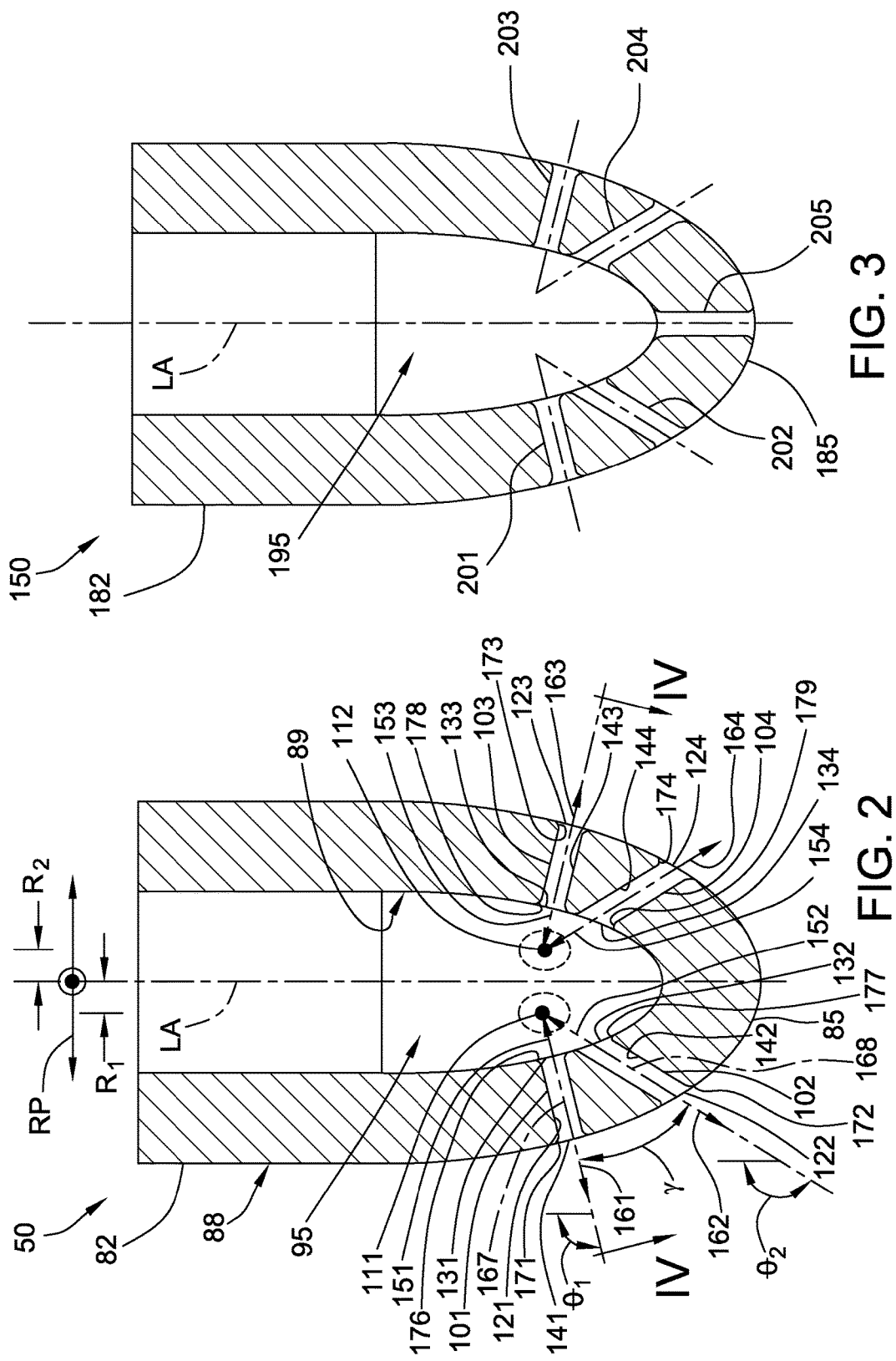

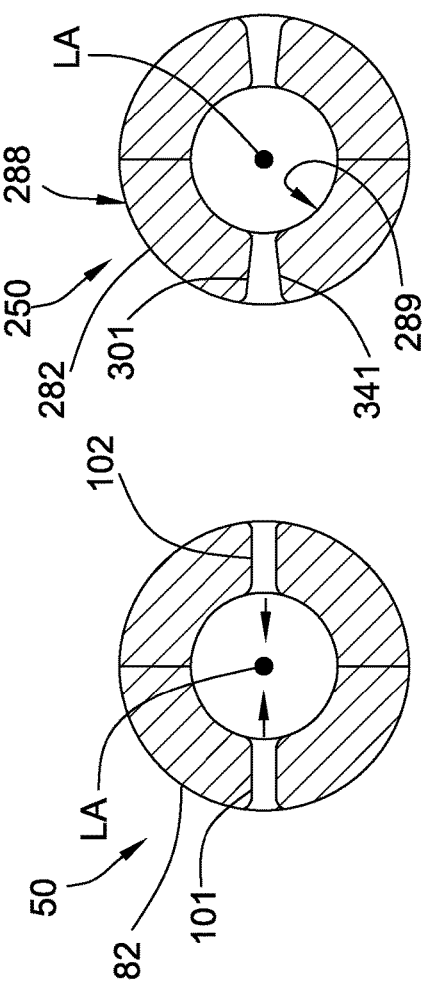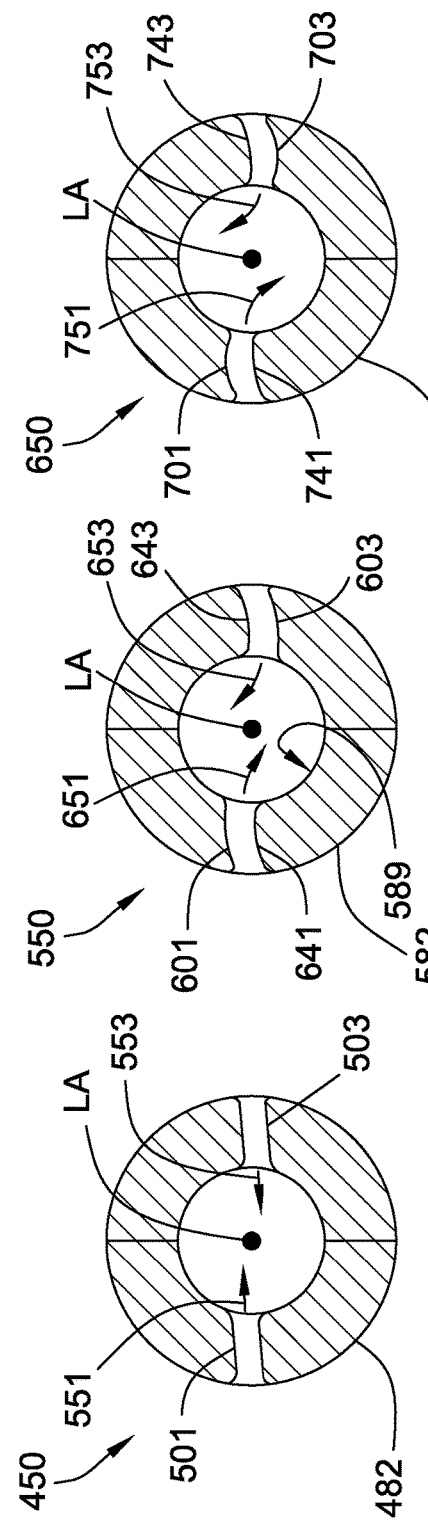

800

Manufacture a nozzle body which extends along a central longitudinal axis between a mounting end and a distal tip, is hollow, and includes an outer surface and an inner surface that defines an interior chamber

810

Define a first orifice in communication with the interior chamber and extending between the outer surface and the inner surface along a first orifice axis

820

Define a second orifice in communication with the interior chamber and extending between the outer surface and the inner surface along a second orifice axis, the first orifice axis and the second orifice axis intersecting at an impingement region in the interior chamber, the impingement region being radially offset from the central longitudinal axis in a radial plane substantially perpendicular to the central longitudinal axis

COMBUSTION SYSTEM, NOZZLE FOR PRECHAMBER ASSEMBLY, AND METHOD OF MAKING SAME

TECHNICAL FIELD

This patent disclosure relates generally to a fuel combustion system for an internal combustion engine and, more particularly, to a nozzle of a prechamber assembly for an internal combustion engine.

BACKGROUND

One type of internal combustion engines typically employ a number of cylinders which compress a fuel and air mixture such that upon firing of a spark plug associated with each cylinder, the compressed mixture ignites. The expanding combustion gases resulting therefrom move a piston within the cylinder. Upon reaching an end of its travel in one direction within the cylinder, the piston reverses direction to compress another volume of the fuel and air mixture. The resulting mechanical kinetic energy can be converted for use in a variety of applications, such as, propelling a vehicle or generating electricity, for example.

Another type of internal combustion engine, known as a compression ignition engine, uses a highly-compressed gas (e.g., air) to ignite a spray of fuel released into a cylinder during a compression stroke. In such an engine, the air is compressed to such a level as to achieve auto-ignition of the fuel upon contact between the air and fuel. The chemical properties of diesel fuel are particularly well suited to such auto-ignition.

The concept of auto-ignition is not limited to diesel engines, however, and has been employed in other types of internal combustion engines as well. For example, a self-igniting reciprocating internal combustion engine can be configured to compress fuel in a main combustion chamber via a reciprocating piston. In order to facilitate starting, each main combustion chamber is associated with a prechamber, particularly useful in starting cold temperature engines. Fuel is injected into not only the main combustion chamber, but also the combustion chamber of the prechamber, as well, such that upon compression by the piston, a fuel and air mixture is compressed in both chambers. A glow plug or other type of heater is disposed within the prechamber to elevate the temperature therein sufficiently to ignite the compressed mixture. The combustion gases resulting from the ignition in the prechamber are then communicated to the main combustion chamber.

Other types of internal combustion engines use natural gas as the fuel source and include at least one piston reciprocating within a respective cylinder. A spark plug is positioned within a cylinder head associated with each cylinder and is fired on a timing circuit such that upon the piston reaching the end of its compression stroke, the spark plug is fired to thereby ignite the compressed mixture.

In still further types of internal combustion engines, prechambers are employed in conjunction with natural gas engines. Given the extremely high temperatures required for auto-ignition with natural gas and air mixtures, glow plugs or other heat sources such as those employed in typical diesel engines, can be ineffective. Rather, a prechamber is associated with each cylinder of the natural gas engine and is provided with a spark plug to initiate combustion within the prechamber which can then be communicated to the main combustion chamber. Such a spark plug-ignited, natural gas engine prechamber is provided in, for example, the 3600 series natural gas engines commercially available from Caterpillar Inc. of Peoria, Ill.

The trend continues to operate these engines under lean-burn conditions. Lean burn refers to the burning of fuel with an excess of air in an internal combustion engine (i.e. lean fuel/air ratio). The excess of air in a lean burn engine combusts more of the fuel and emits fewer unwanted emissions. However, the lean fuel/air ratio can make it difficult to consistently achieve complete and thorough combustion within the main combustion chamber.

U.S. Pat. No. 6,854,439 is entitled, "Prechamber Combustion System," and is directed to a combustion system, particularly for a larger type diesel engine, featuring a prechamber with a generally cup-shaped bottom tip portion facing the engine's main combustion chamber and with a central transfer passage substantially aligned with the centerline of the prechamber and a plurality of additional transfer passages circumferentially arranged about the centerline of the prechamber. The combustion system uses a piston with a deep bowl formed in the piston crown into which the central transfer passage directs a strong direct charge of products of combustion from the prechamber.

There is a continued need in the art to provide additional solutions to enhance combustion in a prechamber to improve efficiency. For example, there is a continued need to enhance combustion in a prechamber by enhancing mixing within a prechamber.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a nozzle for a prechamber assembly of an engine. The nozzle includes a nozzle body having a mounting end and a distal tip. The nozzle body defines a central longitudinal axis extending between the mounting end and the distal tip. The nozzle body is hollow and includes an outer surface and an inner surface. The outer surface defines a first outer opening and a second outer opening. The inner surface defines an interior chamber, a first inner opening, and a second inner opening.

The nozzle body defines a first orifice in communication with the interior chamber. The first orifice extends in a first orifice configuration between the first outer opening and the first inner opening. The nozzle body defines a second orifice in communication with the interior chamber. The second orifice extends in a second orifice configuration between the second outer opening and the second inner opening. The first orifice configuration of the first orifice defines a first entry path projection extending from the first inner opening into the interior chamber. The second orifice configuration of the second orifice defines a second entry path projection extending from the second inner opening into the interior chamber. The first entry path projection of the first orifice and the second entry path projection of the second orifice intersect at an impingement region in the interior chamber. The impingement region is radially offset from the central longitudinal axis in a radial plane substantially perpendicular to the central longitudinal axis.

In still another embodiment, a fuel combustion system includes a cylinder block and a prechamber assembly. The cylinder block defines, at least partially, a main combustion chamber. The prechamber assembly is in communication with the main combustion chamber. The prechamber assembly defines a precombustion chamber, which is in communication with the main combustion chamber.

The prechamber assembly includes a prechamber housing, an ignition device adapted to selectively ignite a fuel source disposed in the precombustion chamber, and a nozzle. The ignition device is mounted to the prechamber housing. The nozzle and the prechamber housing cooperate to define the precombustion chamber.

The nozzle includes a nozzle body having a mounting end and a distal tip. The nozzle body defines a central longitudinal axis extending between the mounting end and the distal tip. The nozzle body is hollow and includes an outer surface and an inner surface. The outer surface defines a first outer opening and a second outer opening. The inner surface defines a first inner opening, a second inner opening, and an interior chamber which comprises a part of the precombustion chamber.

The nozzle body defines a first orifice in communication with the interior chamber and the main combustion chamber. The first orifice extends in a first orifice configuration between the first outer opening and the first inner opening. The nozzle body defines a second orifice in communication with the interior chamber and the main combustion chamber. The second orifice extends in a second orifice configuration between the second outer opening and the second inner opening. The first orifice configuration of the first orifice defines a first entry path projection extending from the first inner opening into the interior chamber. The second orifice configuration of the second orifice defines a second entry path projection extending from the second inner opening into the interior chamber. The first entry path projection of the first orifice and the second entry path projection of the second orifice intersect at an impingement region in the interior chamber. The impingement region is radially offset from the central longitudinal axis in a radial plane substantially perpendicular to the central longitudinal axis.

In yet another embodiment, a method of making a nozzle for a prechamber assembly of an engine is provided. The method of making a nozzle includes manufacturing a nozzle body. The nozzle body has a mounting end and a distal tip. The nozzle body defines a central longitudinal axis extending between the mounting end and the distal tip. The nozzle body is hollow and includes an outer surface and an inner surface. The outer surface defines a first outer opening and a second outer opening. The inner surface defines an interior chamber, a first inner opening, and a second inner opening.

A first orifice in communication with the interior chamber is defined. The first orifice extends in a first orifice configuration between the first outer opening and the first inner opening. The first orifice configuration of the first orifice defines a first entry path projection extending from the first inner opening into the interior chamber.

A second orifice in communication with the interior chamber is defined. The second orifice extends in a second orifice configuration between the second outer opening and the second inner opening. The second orifice configuration of the second orifice defines a second entry path projection extending from the second inner opening into the interior chamber.

The first entry path projection of the first orifice and the second entry path projection of the second orifice intersect at an impingement region in the interior chamber. The impingement region is radially offset from the central longitudinal axis in a radial plane substantially perpendicular to the central longitudinal axis.

Further and alternative aspects and features of the disclosed principles will be appreciated from the following detailed description and the accompanying drawings. As will be appreciated, the principles related to fuel combustion systems, prechamber assemblies, and methods of making nozzles for prechamber assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 2 is an enlarged, partial diagrammatic, longitudinal cross-sectional view of a nozzle constructed in accordance with principles of the present disclosure, as indicated by circle II in FIG. 1, and suitable for use in the prechamber assembly of FIG. 1.

FIG. 3 is a view, as in FIG. 2, of another embodiment of a nozzle constructed in accordance with principles of the present disclosure, the nozzle being suitable for use in embodiments of a prechamber assembly following principles of the present disclosure.

FIG. 4 is a diagrammatic, transverse cross-sectional view of the nozzle of FIG. 2 taken along angled axis IV-IV in FIG. 2.

FIG. 5 is a view, as in FIG. 4, of another embodiment of a nozzle constructed in accordance with principles of the present disclosure, the nozzle being suitable for use in embodiments of a prechamber assembly following principles of the present disclosure.

FIG. 6 is a view, as in FIG. 4, of another embodiment of a nozzle constructed in accordance with principles of the present disclosure, the nozzle being suitable for use in embodiments of a prechamber assembly following principles of the present disclosure.

FIG. 7 is a view, as in FIG. 4, of another embodiment of a nozzle constructed in accordance with principles of the present disclosure, the nozzle being suitable for use in embodiments of a prechamber assembly following principles of the present disclosure.

FIG. 8 is a view, as in FIG. 4, of another embodiment of a nozzle constructed in accordance with principles of the present disclosure, the nozzle being suitable for use in embodiments of a prechamber assembly following principles of the present disclosure.

FIG. 9 is a view, as in FIG. 4, of another embodiment of a nozzle constructed in accordance with principles of the present disclosure, the nozzle being suitable for use in embodiments of a prechamber assembly following principles of the present disclosure.

FIG. 10 is a flowchart illustrating steps of an embodiment of a method of making a nozzle for a prechamber assembly of an engine following principles of the present disclosure.

Figure 1:
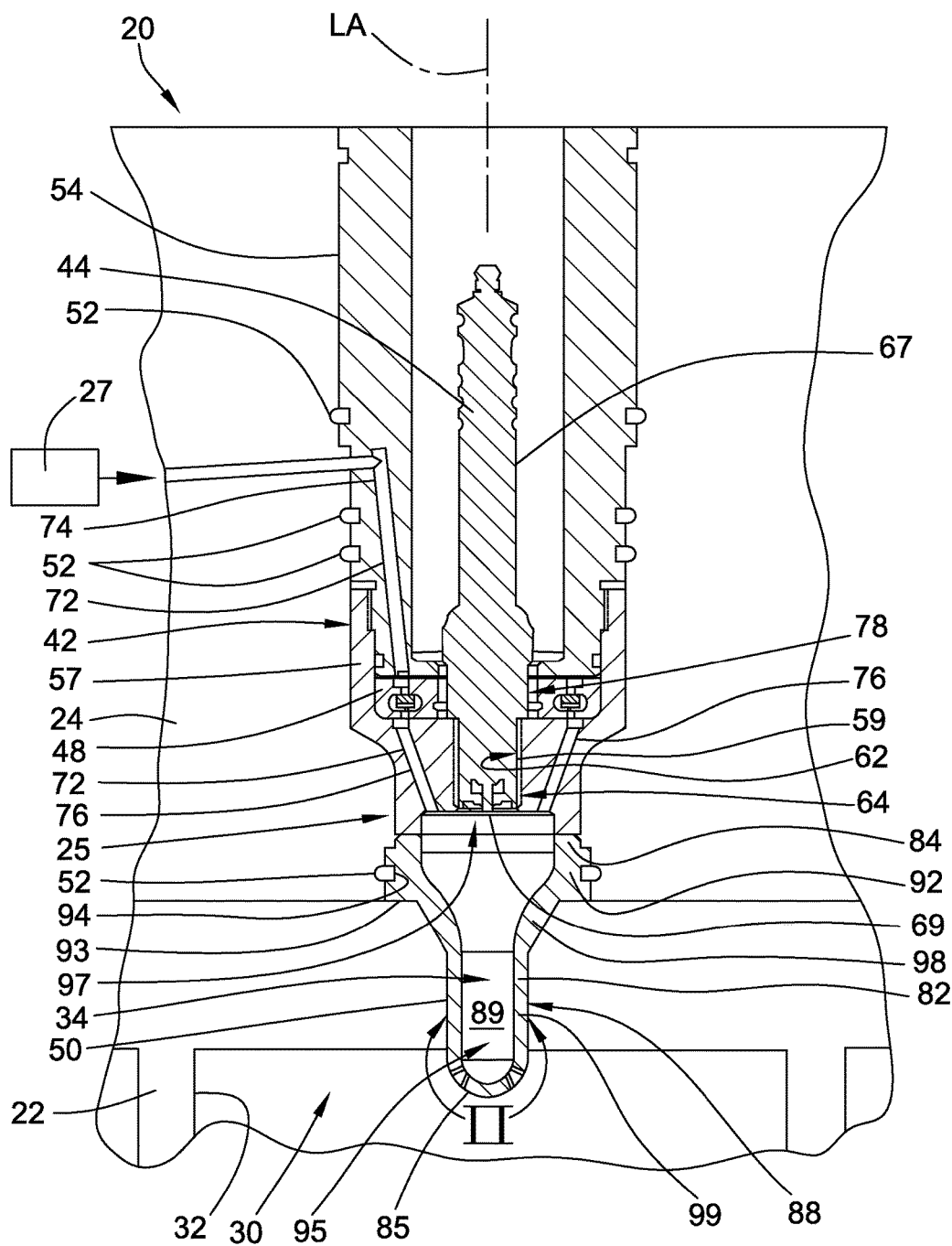
FIG. 1 is a diagrammatic, longitudinal cross-sectional view of an embodiment of a fuel combustion system constructed in accordance with principles of the present disclosure and including an embodiment of a prechamber assembly constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure provides embodiments of a nozzle for a prechamber assembly. In embodiments, the prechamber assembly can be mounted to a cylinder head of an internal combustion engine. Exemplary engines include those used in vehicles, electrical generators, and pumps, for examples.

Embodiments of a nozzle constructed according to principles of the present disclosure can have an orifice configuration that provides a more robust combustion of the fuel mixture within the interior cavity of the nozzle while providing improved prechamber assembly life. Embodiments of a nozzle constructed according to principles of the present disclosure can enhance mixing within the prechamber by impinging the fuel/air mixture entering into the prechamber through the nozzle orifices. In embodiments, the nozzle defines at least two orifices configured to promote swirl/mixing within the precombustion chamber to achieve a more robust flame jet as a result of the enhanced turbulence developed in the nozzle by the configuration of the orifices. In embodiments, the orifices are configured to define an impingement region within the interior chamber defined by the nozzle where the impingement region is radially offset from a central longitudinal axis defined by the nozzle body.

In embodiments, a first flow of gas entering the interior chamber through a first orifice defined in the nozzle body is directed into a second flow of gas entering the interior chamber of the nozzle body through a second orifice thereof such that the first flow of gas mixes with the second flow of gas at an impingement region which is radially offset from a central longitudinal axis defined by the nozzle body. In embodiments, the impingement region is disposed radially between the orifices and the central longitudinal axis such that the first and second flows of gas entering the interior chamber first meet at the impingement region substantially without passing through the central longitudinal axis.

In embodiments, the orifices of the nozzle define an impingement region within the interior chamber defined by the nozzle where the impingement region is radially offset from a central longitudinal axis defined by the nozzle body such that a first flow of gas entering the interior chamber of the nozzle through a first orifice is directed into a second flow of gas entering the interior chamber through a second orifice at the impingement region. The impingement of the relatively cooler air/fuel mixture inside the nozzle body helps to generate turbulence within the interior chamber of the nozzle, which improves the heat transfer between the nozzle body and the flows of the fuel/air mixture moving within the interior chamber. The enhanced heat transfer characteristics can help further cool the orifices of the nozzle to help increase the useful life of the prechamber assembly.

In embodiments, the prechamber assembly can be associated with a supplemental fuel source adapted to direct a flow of fuel into the precombustion chamber of the prechamber assembly through a path other than via the main combustion chamber with which the prechamber assembly is associated. In such embodiments, a control valve, such as a conventional check valve arrangement, can be provided to selectively permit the flow of fuel from the supplemental fuel source into the precombustion chamber of the prechamber assembly to further promote ignition within the precombustion chamber. In embodiments, the fuel of the supplemental fuel source can have a richer fuel/air ratio than the fuel/air ratio of the fuel supplied directly to the main combustion chamber with which the prechamber assembly is associated.

In embodiments, the ignited mixture within the prechamber is discharged through the nozzle orifices into the main combustion chamber with a flame pattern that can substantially avoid flame overlap in the main combustion chamber and can be characterized as having a high swirl pattern. The area covered by the flame pattern discharged from the nozzle after spark plug ignition can be increased relative to a conventional nozzle orifice arrangement. The increased flame area produce by a prechamber assembly constructed according to principles of the present disclosure can help improve combustion of a lean fuel mixture in the main combustion chamber of the cylinder with which it is associated.

In embodiments, the orifices of the nozzle can include fillet surfaces disposed at, and circumscribing, the outer and inner openings of each orifice to help increase the useful life of a prechamber assembly including the nozzle. The fillet surfaces can be configured to help reduce the stresses imposed upon the nozzle body surfaces that define the orifices, thereby diminishing the deleterious effects caused by the passage of the fuel/air mixture through the orifices and the flame discharge therefrom.

Turning now to the FIGURES, there is shown in FIG. 1 an exemplary embodiment of a fuel combustion system 20 constructed in accordance with principles of the present disclosure. The fuel combustion system 20 can be used in any suitable internal combustion engine, such as an engine configured as part of an electrical generator or a pump, for example. The fuel combustion system 20 can be used with any suitable fuel with an appropriate fuel/air ratio. In embodiments, fuels with different ignition and burning characteristics and different specific air to fuel ratios can be used. The fuel combustion system 20 can include a cylinder block 22, a cylinder head 24, a prechamber assembly 25 constructed in accordance with principles of the present disclosure, a supplemental fuel source 27, and a variety of other combustion devices, as will be appreciated by one skilled in the art.

The cylinder block 22 defines, at least partially, a main combustion chamber 30. In embodiments, the cylinder block 22 can define a plurality of cylinders 32 (one of which is shown in FIG. 1) within which is defined the corresponding main combustion chamber 30. In embodiments, a cylinder liner can be disposed within each cylinder 32. The cylinder liner can be removably secured in the cylinder block 22.

The cylinder head 24 can be removably attached to the cylinder block 22 via suitable fasteners, such as a plurality of bolts, as will be appreciated by one skilled in the art. A gasket (not shown) can be interposed between the cylinder block 22 and the cylinder head 24 to seal the interface therebetween. The cylinder head 24 typically has bores machined for engine valves (not shown), e.g., inlet and exhaust valves, and combustion devices (not shown), e.g., fuel injectors, glow plugs, sparks plugs, and combinations thereof, as will be appreciated by one skilled in the art.

Each cylinder 32 of the cylinder block 22 can house a reciprocally movable piston (not shown), which is coupled to a crankshaft via a suitable transfer element (e.g., a piston rod or connecting rod). The piston is reciprocally movable within the cylinder 32 for compressing and thereby pressurizing the combustible mixture in the main combustion chamber 30 during a compression phase of the engine. In embodiments, the engine can be configured to have a suitable compression ratio suited for the intended purpose of the engine as will be understood by one skilled in the art.

In embodiments, at least one intake valve mechanism (not shown) and at least one exhaust valve mechanism (not shown) can be operatively positioned within the cylinder head 24 such that the intake valve and the exhaust valve are axially movable in the cylinder head 24. In embodiments, a mechanical valve train (e.g., including a cam, follower, and push rod mechanism) or other hydraulic and/or electric control device can be used in a conventional manner to selectively operate the intake valve mechanism and the exhaust valve mechanism. In particular, the inlet valve mechanism can be opened to admit a predetermined amount of a lean gaseous combustible mixture of air and fuel directly into the main combustion chamber 30 above the piston during an intake phase of the engine. The exhaust valve mechanism can be opened to permit the exhaust of the gases of combustion from the main combustion chamber 30 during an exhaust phase of the engine.

The cylinder head 24 and the cylinder block 22 can also define cooling passages therein. In embodiments, any suitable cooling system can be placed in fluid communication with the cooling passages to circulate a coolant fluid through the cooling passages in the cylinder block 22 and the cylinder head 24.

The prechamber assembly 25 is removably secured in the cylinder head 24 such that the prechamber assembly 25 is in communication with the main combustion chamber 30. The prechamber assembly 25 defines a precombustion chamber 34, which is in communication with the main combustion chamber 30. The prechamber assembly 25 includes a prechamber housing 42, an ignition device 44 adapted to selectively ignite a fuel disposed in the precombustion chamber 34, a control valve 48, and a nozzle 50. The nozzle 50 and the prechamber housing 42 can be made from any suitable material, such as a suitable, heat-resistant metal. Suitable sealing devices 52, such as o-rings, for example, can be disposed between the prechamber assembly 25 and the cylinder head 24. In other embodiments, other sealing techniques, such as, press fit, metal seals, and the like, can be used.

The nozzle 50 and the prechamber housing 42 cooperate together to define the precombustion chamber 34 and to define a central longitudinal axis LA of the prechamber assembly 25. The nozzle 50 and the prechamber housing 42 include surfaces that are generally surfaces of revolution about the central longitudinal axis LA. The precombustion chamber 34 has a predetermined geometric shape and volume. In embodiments, the volume of the precombustion chamber 34 is smaller than the volume of the main combustion chamber 30. In some embodiments, the volume of the precombustion chamber 34 is in a range between about two and about five percent of the total uncompressed volume of the main combustion chamber 30.

In the illustrated embodiment, the prechamber housing 42 includes an upper member 54 and a lower member 57, which are threadingly secured together. In other embodiments, other types of engagement between the upper member 54 and the lower member 57 can be used, such as, welding, press fitting, and the like. The prechamber housing 42 is hollow and is adapted to receive the ignition device 44 therein.

The ignition device 44 is mounted to the prechamber housing 42. The lower member 57 of the prechamber housing 42 defines an ignition device bore 59 which has an internal threaded surface 62. The ignition device 44 has an external threaded surface 64 which is threadedly engaged with the internal threaded surface 62 of the ignition device bore 59. The ignition device bore 59 is in communication with the precombustion chamber 34.

In the illustrated embodiment, the ignition device 44 comprises a spark plug 67 with an electrode 69. The spark plug 67 is removably mounted to the prechamber housing 42 such that the electrode 69 is in communication with the precombustion chamber 34 and that the electrode 69 is substantially aligned with the central longitudinal axis LA. The spark plug 67 is threadedly received in the ignition device bore 59 with the electrode 69 exposed to the precombustion chamber 34 by way of the ignition device bore 59. The spark plug 67 can be adapted to be electrically energized in a conventional manner.

In embodiments, at least one of the prechamber housing 42 and the nozzle 50 define a fuel passage 72. The fuel passage 72 is in communication with the precombustion chamber 34 and with the supplemental fuel source 27. In embodiments, the fuel of the supplemental fuel source 27 can have a richer fuel/air ratio than the fuel/air ratio of the fuel supplied directly to the main combustion chamber 30 with which the prechamber assembly 25 is associated. In embodiments, the fuel source 27 can be shut off or omitted in applications where the fuel mixture supplied to the main combustion chamber 30 is adequately rich with fuel to support consistent combustion without the use of the supplemental fuel source 27.

In the illustrated embodiment of FIG. 1, the upper member 54 and the lower member 57 of the prechamber housing 42 both define the fuel passage 72. The illustrated upper segment defines a fuel passage entry segment 74. The illustrated lower member 57 of the prechamber housing 42 defines a plurality of precombustion chamber fuel passage segments 76 which are circumferentially arranged about the lower member 57 and in fluid communication with the fuel passage entry segment via a control valve cavity 78 defined between the upper member 54 and the lower member 57.

The control valve 48 is disposed within the prechamber housing 42 and is adapted to selectively occlude the fuel passage 72 to prevent a flow of fuel from the supplemental fuel source 27 to the precombustion chamber 34. The illustrated control valve 48 is disposed within the control valve cavity 78 and is interposed between the fuel passage entry segment 74 and the precombustion chamber fuel passage segments 76. The control valve 48 can be adapted to selectively permit the flow of fuel from the supplemental fuel source 27 into the precombustion chamber 34 of the prechamber assembly 25 to further promote ignition within the precombustion chamber 34. The control valve 48 can be adapted to open and close with the engine's combustion cycle to prevent contamination of the fuel with exhaust and/or leakage of fuel into the exhaust gases. The control valve 48 can be adapted to prevent the gas product of combustion to flow from the precombustion chamber 34 to the fuel passage entry segment 74 of the fuel passage 72 during the compression, combustion, and exhaust phases of the engine.

In embodiments, the control valve 48 can be any suitable control valve, such as a check valve assembly including a free-floating ball check having an open mode position permitting the flow of the fuel from the supplemental fuel source 27 to the precombustion chamber 34 and a closed mode position preventing gas flow from the supplemental fuel source 27 to the precombustion chamber 34. In other embodiments, the control valve 48 can be a shuttle type check valve. In the illustrated embodiment, the control valve 48 is similar in construction and function to the check valve shown and described in U.S. Pat. No. 6,575,192.

The nozzle 50 includes a nozzle body 82 having a mounting end 84 and a distal tip 85. The nozzle body 82 defines the central longitudinal axis LA which extends between the mounting end 84 and the distal tip 85. The nozzle body 82 is hollow and includes an outer surface 88 and an inner surface 89. The outer surface 88 and the inner surface 89 are both surfaces of revolution about the central longitudinal axis LA.

The mounting end of the nozzle 50 is in abutting relationship with the lower member 57 of the prechamber housing 42. Any suitable technique can be used to provide a seal between the nozzle 50 and the lower member 57 of the prechamber housing 42, such as, o-rings, press fit, metal seals, gaskets, welding, and the like. The mounting end 84 of the nozzle body 82 includes an annular flange 92 that defines a seat 93 which can be engaged with the cylinder block 22 and/or the cylinder head 24. The mounting end 84 of the nozzle body 82 defines an external circumferential groove 94 configured to receive a suitable sealing device 52 (e.g., an o-ring) therein for sealing. The nozzle body 82 projects from the cylinder head 24 such that the distal tip 85 of the nozzle body 82 is disposed in the main combustion chamber 30. Any suitable sealing technique can be used to seal the interface between the nozzle 50 and the cylinder head 24 and/or the cylinder block 22, such as, a gasket, a taper fit, and/or a press fit to isolate fuel, combustion gases, and engine coolant therein.

The inner surface 89 of the nozzle body 82 defines an interior chamber 95 which is open to and in communication with a distal cavity 97 defined in the lower member 57 of the prechamber housing 42. The interior chamber 95 of the nozzle body 82 and the distal cavity 97 of the lower member 57 together define the precombustion chamber 34 of the prechamber assembly 25. The interior chamber 95 of the nozzle body 82 is open to the electrode 69 of the spark plug 67 and is in fluid communication with the fuel passage 72 via the precombustion chamber fuel passage segments 76 of the lower member 57.

The mounting end 84 of the nozzle body 82 is generally cylindrical. The nozzle body 82 includes a converging portion 98 disposed adjacent the mounting end 84 and a distal cylindrical portion 99 adjacent the distal tip 85. The distal cylindrical portion 99 has a smaller diameter than that of the mounting end 84.

Referring to FIG. 2, the nozzle body 82 defines a plurality of orifices 101, 102, 103, 104 in the distal tip 85. The orifices 101, 102, 103, 104 are in communication with the interior chamber 95 of the nozzle body 82 and with the main combustion chamber 30 when the prechamber assembly 25 is installed in the cylinder head 24.

The orifices 101, 102, 103, 104 are configured to promote swirl/mixing within the precombustion chamber 34 of the prechamber assembly 25 at a location removed from the electrode 69 of the spark plug 67. In embodiments, at least two of the orifices 101, 102 are configured to define an impingement region 111 within the interior chamber of the nozzle body where the impingement region 111 is radially offset from the central longitudinal axis LA defined by the nozzle body 82 by a radial offset distance $R_1$. In embodiments, the impingement region 111 defined by the first and second orifices 101, 102 is disposed radially between the first and second inner openings 131, 132 and the central longitudinal axis LA.

In embodiments, a first flow of gas entering the interior chamber 95 through the first orifice 101 is directed into a second flow of gas entering the interior chamber 95 of the nozzle body 82 through the second orifice 102 thereof such that the first flow of gas mixes with the second flow of gas at the impingement region 111 to promote the turbulence within the interior chamber 95 at a location that is radially offset from the longitudinal axis LA and the electrode 69 of the spark plug 67 (see FIG. 1). In embodiments, the impingement region 111 is disposed radially between the first and second orifices 101, 102 and the central longitudinal axis LA such that the first and second flows of gas entering the interior chamber 95 impinge at the impingement region 111 substantially without passing through the central longitudinal axis LA on the way to the impingement region 111. The first orifice 101 and the second orifice 102 can be configured such that first and second flows of burning gases conveyed from the interior chamber 95 out through the first and second orifices 101, 102, respectively, are controllably directed away from the nozzle body 82 in diverging relationship to each other, controllably expanding the burning gases away from the interior chamber 95 in the main combustion chamber 30 in order to facilitate the ignition and burning of the combustible mixture in the main combustion chamber 30 over a larger volume at the same time.

In the illustrated embodiment, the first orifice 101 and the second orifice 102 are configured to define the first impingement region 111 within the interior chamber 95 of the nozzle body 82. The third orifice 103 and the fourth orifice 104 are configured to define a second impingement region 112 within the interior chamber 95 of the nozzle body 82 where the second impingement region 112 is radially offset from the central longitudinal axis LA defined by the nozzle body 82 by a second radial offset distance $R_2$. In the illustrated embodiment, the first orifice 101 and the second orifice 102 are substantially mirror images of the third orifice 103 and the fourth orifice 104, respectively. The orifices 101, 102; 103, 104 are respectively symmetrically disposed about the central longitudinal axis LA such that the first radial offset distance $R_1$ and the second radial offset distance $R_2$ are substantially the same. In other embodiments, the first and second impingement regions 111, 112 can be disposed at radial offset distances that are different from each other. Preferably, the orifices 101, 102, 103, 104 are configured such that the flow characteristics of a fuel/air mixture within the precombustion chamber in a region adjacent the electrode 69 of the spark plug is less turbulent and more laminar than that in the impingement regions 111, 112.

In embodiments, the nozzle body 82 can define any suitable number of orifices to achieve the desired swirl/mixing characteristics within the interior chamber of the nozzle body and the desired flame discharge pattern in the main combustion chamber 30 resulting from the combustion phase in the nozzle 50. For example, in embodiments, the nozzle body 82 can define eight pairs of cooperating orifices to define eight impingement regions radially offset from the central longitudinal axis LA and circumferentially arranged about the central longitudinal axis LA at substantially evenly-spaced azimuth positions (about forty-five degrees apart from each other). In other embodiments, the nozzle body 82 can define twelve pairs of cooperating orifices to define twelve impingement regions radially offset from the central longitudinal axis LA and circumferentially arranged about the central longitudinal axis LA at substantially evenly-spaced azimuth positions (about thirty degrees apart from each other). In still other embodiments, the nozzle body 82 can define yet a different number of cooperating orifices Referring to FIG. 2, the outer surface 88 defines a first outer opening 121 and a second outer opening 122. The inner surface 89 defines a first inner opening 131 and a second inner opening 132. The first orifice 101 extends in a first orifice configuration 141 between the first outer opening 121 and the first inner opening 131. The second orifice 102 extends in a second orifice configuration 142 between the second outer opening 122 and the second inner opening 132.

The first orifice configuration 141 of the first orifice 101 defines a first entry path projection 151 extending from the first inner opening 131 into the interior chamber 95. The second orifice configuration 142 of the second orifice 102 defines a second entry path projection 152 extending from the second inner opening 132 into the interior chamber 95. The first entry path projection 151 of the first orifice 101 and the second entry path projection 152 of the second orifice 102 intersect at the impingement region 111 in the interior chamber 95. The impingement region 111 is radially offset from the central longitudinal axis LA in a radial plane RP substantially perpendicular to the central longitudinal axis LA. In embodiments, the first entry path projection 151 of the first orifice 101 and the second entry path projection 152 of the second orifice 102 intersect at the impingement region 111 in the interior chamber 95 substantially without first intersecting the central longitudinal axis LA on the way from the respective first and second inner openings 131, 132 to the impingement region 111.

The first orifice configuration 141 of the first orifice 101 defines a first exit path projection 161 extending from the first outer opening 121 away from the nozzle body 82. The second orifice configuration 142 of the second orifice 102 defines a second exit path projection 162 extending from the second outer opening 122 away from the nozzle body 82. The first exit path projection 161 of the first orifice 101 and the second exit path projection 162 of the second orifice 102 are in diverging relationship to each other in the main combustion chamber 30 moving away from the outer surface 88 of the nozzle body 82.

In embodiments, the entry path projections 151, 152 and the exit path projections 161, 162 of the orifices 101, 102 can be determined by extending a geometric projection of the shape of the orifice into the empty space of the interior chamber 95 or away from the nozzle body, respectively. In other embodiments, any suitable modeling technique, such as, computational fluid dynamics, for example, can be used to model an expected flow path of a flow of gas entering the interior chamber 95 via the orifice 101, 102 in question in the case of the entry path projections 151, 152. The entry path projection 151, 152 can be aligned with the expected flow path from the inner surface 89 into the interior chamber 95 after being transmitted through the orifice 101, 102 in question. Similar modeling techniques can be used to model a flow of ignited gas away from the nozzle body 82 in the case of the exit path projections 161, 162 and align the exit path projections 161, 162 with the modeled exit flows.

In embodiments, the first orifice 101 extends along a first angle of inclination $\theta_1$ relative to the central longitudinal axis LA. The second orifice 102 extends along a second angle $\theta_2$ of inclination relative to the central longitudinal axis LA. In embodiments, the second angle of inclination $\theta_2$ is different from the first angle of inclination $\theta_1$.

The illustrated first and second orifice configurations 141, 142 are cylinders defined by a symmetric surface of revolution along first and second cylinder axes 167, 168, respectively. The first cylinder axis 167 is disposed at the first angle of inclination $\theta_1$ relative to the central longitudinal axis LA. The second cylinder axis 168 is disposed at the second angle of inclination $\theta_2$ relative to the central longitudinal axis. The illustrated second angle of inclination $\theta_2$ is different from the first angle of inclination $\theta_1$. In embodiments, the first angle of inclination $\theta_1$ and the second angle of inclination $\theta_2$ define a convergence angle $\gamma$ therebetween. The illustrated convergence angle $\gamma$ is an acute angle.

The first and second orifices 101, 102 are substantially aligned with each other with respect to their circumferential position (or azimuth position) about the central longitudinal axis relative to the radial plane RP. The first cylinder axis 167 is disposed at a first azimuth of angular position relative to the radial plane RP. The second cylinder axis 168 is disposed at a second azimuth of angular position relative to the radial plane RP. The first azimuth is substantially the same as the second azimuth. In embodiments, the first azimuth can be angularly displaced relative to the second azimuth.

In embodiments, the orifices 101, 102, 103, 104 of the nozzle 50 can include outer and inner fillet surfaces 171, 172, 173, 174; 176, 177, 178, 179 disposed at, and circumscribing, the respective outer and inner openings 121, 122, 123, 124; 131, 132, 133, 134 of each orifice 101, 102, 103, 104 to help increase the useful life of the prechamber assembly 25 including the nozzle 50 by helping to diminish the deleterious effects caused by the passage of the fuel/air mixture through the orifices 101, 102, 103, 104 and the flame discharged therefrom. The outer fillet surfaces 171, 172, 173, 174 can help reduce the stresses imposed upon the nozzle body 82 by the respective flows of the fuel/air mixture through the orifices 101, 102, 103, 104 into the interior chamber 95 of the nozzle body 82. The inner fillet surfaces 176, 177, 178, 179 can help reduce the stresses imposed upon the nozzle body by the flame discharged from the interior chamber 95 through the orifices 101, 102, 103, 104.

The first orifice 101 includes a first outer rounded fillet surface 171 and a first inner rounded fillet surface 176 disposed at, and circumscribing, the first outer opening 121 and the first inner opening 131, respectively. The second orifice 102 includes a second outer rounded fillet surface 172 and a second inner rounded fillet surface 177 disposed at, and circumscribing, the second outer opening 122 and the second inner opening 132, respectively. The third and fourth orifices 103, 104 are similarly configured.

In the illustrated embodiment, the outer and inner fillet surfaces 171, 172, 173, 174; 176, 177, 178, 179 comprise rounded, convex fillet surfaces. In other embodiments, at least one of the outer and inner fillet surfaces 171, 172, 173, 174; 176, 177, 178, 179 can have a different shape which is configured to help diminish the erosive nature of the flows travelling into the interior chamber 95 of the nozzle 50 and the flame discharging therefrom. For example, in other embodiments, the outer and inner fillet surfaces 171, 172, 173, 174; 176, 177, 178, 179 can comprise planar bevel surfaces or rounded concave surfaces. In yet other embodiments, the outer fillet surfaces 171, 172, 173, 174 can be different from the inner fillet surfaces 176, 177, 178, 179.

The third and fourth orifices 103, 104 are substantially the same as the first and second orifices 101, 102, but are respective mirror images of each other. The outer surface 88 defines a third outer opening 123 and a fourth outer opening 124. The inner surface 89 defines a third inner opening 133 and a fourth inner opening 134. The third orifice 103 is in communication with the interior chamber 95 and extends in a third orifice configuration 143 between the third outer opening 123 and the third inner opening 133. The fourth orifice 104 is in communication with the interior chamber 95 and extends in a fourth orifice configuration 144 between the fourth outer opening 124 and the fourth inner opening 134. The third orifice configuration 143 of the third orifice 103 defines a third entry path projection 153 extending from the third inner opening 133 into the interior chamber 95, and the fourth orifice configuration 144 of the fourth orifice 104 defines a fourth entry path projection 154 extending from the fourth inner opening 134 into the interior chamber 95.

The third entry path projection 153 of the third orifice 103 and the fourth entry path projection 154 of the fourth orifice 104 intersect at the second impingement region 112 in the interior chamber 95. The second impingement region 112 is radially offset in the radial plane RP from the central longitudinal axis LA and from the impingement region 111 of the first entry path projection 151 and the second entry path projection 152.

The third orifice configuration 143 of the third orifice 103 defines a third exit path projection 163 extending from the third outer opening 123 away from the nozzle body 82. The fourth orifice configuration 144 of the fourth orifice 104 defines a fourth exit path projection 164 extending from the fourth outer opening 124 away from the nozzle body 82. The third exit path projection 163 of the third orifice 103 and the fourth exit path projection 164 of the fourth orifice 104 are in diverging relationship to each other in the main combustion chamber 30 moving away from the outer surface 88 of the nozzle body 82. The third and fourth orifices 103, 104 are similar in construction and function to the first and second orifices 101, 102, respectively, in other respects.

Referring to FIG. 3, another embodiment of a nozzle 150 constructed in accordance with principles of the present disclosure is shown. The nozzle 150 is suitable for use in a fuel system having a prechamber assembly constructed in accordance with principles of the present disclosure. The nozzle 150 includes a nozzle body 182 that defines a plurality of orifices 201, 202, 203, 204, 205 in the distal tip 185. The orifices 101, 102, 103, 104, 105 are in communication with the interior chamber 195 of the nozzle body 182 and with the main combustion chamber 30 when the prechamber assembly 25 is installed in the cylinder head 24. The first four orifices 201, 202, 203, 204 of the nozzle body 182 are respectively substantially the same as the orifices 101, 102, 103, 104 of the nozzle body 82 of FIG. 2. The fifth orifice 205 is substantially aligned with the central longitudinal axis LA of the nozzle body 182. The nozzle 150 of FIG. 3 is similar in other respects to the nozzle 50 of FIGS. 1 and 2.

Referring to FIG. 4, a transverse cross-sectional view is shown of the nozzle 50 of FIG. 2 taken along angled axis IV-IV in FIG. 2. The first and third orifices 101, 103 are in opposing relationship to each other about the circumference of the nozzle body 82. The second and fourth orifices 102, 104 are respectively disposed at the same azimuth of angular position relative to the radial plane RP as the first and third orifices 101, 103. In embodiments, at least one of the first entry path projection 151 of the first orifice 101 and the second entry path projection 153 of the second orifice 102 is in intersecting relationship with the central longitudinal axis LA. In the illustrated embodiment, the entry path projections 151, 152, 153, 154 of the four orifices 101, 102, 103, 104 are in interesting relationship with the central longitudinal axis LA.

Referring to FIG. 5, another embodiment of a nozzle 250 constructed in accordance with principles of the present disclosure is shown. The nozzle 250 is suitable for use in a fuel system having a prechamber assembly constructed in accordance with principles of the present disclosure. In embodiments, the nozzle 150 includes a nozzle body 282 having at least one orifice 301 with an orifice configuration 341 having a positive taper from the inner surface 289 to the outer surface 288 of the nozzle body 382. The nozzle 250 of FIG. 5 is similar in other respects to the nozzle 50 of FIGS. 1 and 2.

Referring to FIG. 6, another embodiment of a nozzle 350 constructed in accordance with principles of the present disclosure is shown. The nozzle 350 is suitable for use in a fuel system having a prechamber assembly constructed in accordance with principles of the present disclosure. In embodiments, the nozzle 350 includes a nozzle body 382 having at least one orifice 401 with an orifice configuration 441 having a negative taper from the inner surface 389 to the outer surface 388 of the nozzle body 382. The nozzle 350 of FIG. 6 is similar in other respects to the nozzle 50 of FIGS. 1 and 2.

Referring to FIG. 7, another embodiment of a nozzle 450 constructed in accordance with principles of the present disclosure is shown. The nozzle 450 is suitable for use in a fuel system having a prechamber assembly constructed in accordance with principles of the present disclosure. In embodiments, the nozzle 450 includes a nozzle body 482 having at least one orifice 501 with an entry path projection 551 that is in non-intersecting relationship with the central longitudinal axis LA. The illustrated nozzle body 482 includes a plurality of orifices 501, 503 that each defines entry path projections 551, 553 that are in non-intersecting relationship with the central longitudinal axis LA. The nozzle 450 of FIG. 6 is similar in other respects to the nozzle 50 of FIGS. 1 and 2.

Referring to FIG. 8, another embodiment of a nozzle 550 constructed in accordance with principles of the present disclosure is shown. The nozzle 550 is suitable for use in a fuel system having a prechamber assembly constructed in accordance with principles of the present disclosure. In embodiments, the nozzle 550 includes a nozzle body 582 having at least one orifice 601 with an orifice configuration 641 that comprises a torus segment. The illustrated nozzle body 582 includes a plurality of orifices 601, 603 that each has an orifice configuration 641, 643 that comprises a torus segment. The orifice configurations 641, 643 define entry path projections 651, 653 that are in non-intersecting relationship with the central longitudinal axis LA. The entry path projections 651, 653 can be determined by extending the torus segments from the inner surface 589 in a continuing torus segment along the same radius followed by the orifice configurations 641, 643. The nozzle 550 of FIG. 8 is similar in other respects to the nozzle 50 of FIGS. 1 and 2.

Referring to FIG. 9, another embodiment of a nozzle 650 constructed in accordance with principles of the present disclosure is shown. The nozzle 650 is suitable for use in a fuel system having a prechamber assembly constructed in accordance with principles of the present disclosure. In embodiments, the nozzle 650 includes a nozzle body 682 having at least one orifice 701 with an orifice configuration 741 that comprises an asymmetric torus segment. The illustrated nozzle body 682 includes a plurality of orifices 701, 703 that each has an orifice configuration 741, 743 that comprises an asymmetric torus segment. The orifice configurations 741, 743 define entry path projections 751, 753 that are in non-intersecting relationship with the central longitudinal axis LA. The entry path projections 751, 753 can be determined by modeling the gas flow from the inner surface 689 after traveling through the respective orifices 701, 703 and aligning the entry path projections 751, 753 with the modeled flow paths. The entry path projections 751, 753 can also be determined by geometric projection of the shape. The nozzle 650 of FIG. 9 is similar in other respects to the nozzle 50 of FIGS. 1 and 2.

It will be apparent to one skilled in the art that various aspects of the disclosed principles relating to prechamber assemblies may be used with a variety of engines. Accordingly, one skilled in the art will understand that, in other embodiments, an engine following principles of the present disclosure can include different components and can take on different forms.

Referring to FIG. 10, steps of an embodiment of a method 800 of making a nozzle for a prechamber assembly of an engine following principles of the present disclosure are shown. The method 800 of making a nozzle includes manufacturing a nozzle body (step 810). The nozzle body has a mounting end and a distal tip. The nozzle body defines a central longitudinal axis extending between the mounting end and the distal tip. The nozzle body is hollow and includes an outer surface and an inner surface. The outer surface defines a first outer opening and a second outer opening. The inner surface defines an interior chamber, a first inner opening, and a second inner opening.

A first orifice in communication with the interior chamber is defined (step 820). The first orifice extends in a first orifice configuration between the first outer opening and the first inner opening. The first orifice configuration of the first orifice defines a first entry path projection extending from the first inner opening into the interior chamber.

A second orifice in communication with the interior chamber is defined (step 830). The second orifice extends in a second orifice configuration between the second outer opening and the second inner opening. The second orifice configuration of the second orifice defines a second entry path projection extending from the second inner opening into the interior chamber.

The first entry path projection of the first orifice and the second entry path projection of the second orifice intersect at an impingement region in the interior chamber. The impingement region is radially offset from the central longitudinal axis in a radial plane substantially perpendicular to the central longitudinal axis.

In embodiments, the nozzle body is manufactured from a suitable metal, such as a metal alloy. In embodiments, the nozzle body is manufactured and the first orifice and the second orifice are defined via additive manufacturing (also sometimes referred to as "3D printing"). In embodiments, a method of making a nozzle for a prechamber assembly of an engine following principles of the present disclosure can be used to make any embodiment of a nozzle according to principles of the present disclosure.

INDUSTRIAL APPLICABILITY

The industrial applicability of the embodiments of a fuel combustion system, a nozzle for a prechamber assembly, and a method of making the same as described herein will be readily appreciated from the foregoing discussion. At least one embodiment of a prechamber assembly constructed according to principles of the present disclosure can be used in an engine to help operate the engine with a lean fuel/air ratio. Embodiments of a nozzle and/or a prechamber assembly according to principles of the present disclosure may find potential application in any suitable engine. Exemplary engines include those used in electrical generators and pumps, for example.

In internal combustion engines, above a particular capacity, the energy of an ignition spark may no longer be sufficient to ignite reliably the combustion gas/air mixture, which for emissions reasons is often very lean, in the main combustion chamber. To increase the ignition energy, a prechamber assembly constructed according to principles of the present disclosure can be connected to the cylinder head and placed in communication with the main combustion chamber via a plurality of orifices defined in the nozzle. A small part of the mixture is enriched with a small quantity of combustion gas or an additional fuel and ignited in the precombustion chamber. Flame propagation, i.e. ignition kernel, is transferred to the main combustion chamber by way of the orifices in the nozzle and the flame propagation ignites the lean fuel mixture. The discharge flame pattern emitting from the nozzle is advantageous because it has a hot surface area that can ignite even extremely lean or diluted combustible mixtures in a repeatable manner.

A prechamber assembly constructed according to principles of the present disclosure can help enhance mixing within the precombustion chamber so that leaner mixture can be used for $NO_x$ control and improved misfire capability with faster combustion due to increased non-overlapping flame area for improved engine efficiency. In embodiments, a nozzle constructed according to principles of the present disclosure can define orifices located so that at least two separate flows of the fuel/air mixture from the combustion chamber are impinged upon entering the precombustion chamber resulting in high turbulence. The impinging orifices are arranged such that flows of gas passing therethrough into the nozzle body converge in the precombustion chamber at one or more impingement regions radially offset from the central longitudinal centerline. The impinging orifices can be configured to introduce swirl characteristics in the fuel mixture conveyed into the precombustion chamber to further enhance mixing. A robust flame jet can be developed in the interior chamber as a result of the enhanced turbulence in the interior chamber of the nozzle body.

Embodiments of a nozzle constructed according to principles of the present disclosure can have an orifice configuration that provides a more robust combustion of the fuel mixture within the interior cavity of the nozzle while providing improved prechamber assembly life. The flame discharge pattern from the impinging orifices can spread the flame pattern outwardly, such that flame overlap is reduced in high swirl engines and the flame area in the main combustion chamber is increased.

In embodiments, the impingement of the relatively cooler air/fuel mixture inside the nozzle body helps to generate turbulence within the interior chamber of the nozzle, which improves the heat transfer between the nozzle body and the flows of the fuel/air mixture moving within the interior chamber. The improved heat transfer characteristics can help reduce the amount of heat-induced damage suffered by the nozzle body during operation. The orifices of the nozzle can include fillet surfaces disposed at, and circumscribing, the outer and inner openings of each orifice to help increase the useful life of a prechamber assembly including the nozzle. The fillet surfaces can be configured to help reduce the stresses imposed upon the nozzle body surfaces that define the orifices, thereby diminishing the deleterious effects caused by the passage of the fuel/air mixture through the orifices and the flame discharge therefrom.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A nozzle for a prechamber assembly of an engine comprising:
   a nozzle body, the nozzle body having a mounting end and a distal tip, the nozzle body defining a central longitudinal axis extending between the mounting end and the distal tip, the nozzle body being hollow and including an outer surface and an inner surface, the outer surface defining a first outer opening and a second outer opening, the inner surface defining an interior chamber, a first inner opening, and a second inner opening; and
   wherein the nozzle body defines a first orifice in communication with the interior chamber, the first orifice extending in a first orifice configuration along a first angle of inclination relative to the central longitudinal axis between the first outer opening and the first inner opening, and the nozzle body defines a second orifice in communication with the interior chamber, the second orifice extending in a second orifice configuration along a second angle of inclination relative to the central longitudinal axis between the second outer opening and the second inner opening, the second angle of inclination being different from the first angle of inclination, the first orifice configuration of the first orifice defining a first entry path projection extending from the first inner opening into the interior chamber, and the second orifice configuration of the second orifice defining a second entry path projection extending from the second inner opening into the interior chamber, the first entry path projection of the first orifice and the second entry path projection of the second orifice intersecting at an impingement region in the interior chamber, the impingement region being radially offset from the central longitudinal axis in a radial plane substantially perpendicular to the central longitudinal axis.

2. The nozzle according to claim 1, wherein the first orifice includes a first outer fillet surface and a first inner fillet surface disposed at, and circumscribing, the first outer opening and the first inner opening, respectively, and the second orifice includes a second outer fillet surface and a second inner fillet surface disposed at, and circumscribing, the second outer opening and the second inner opening, respectively.

3. The nozzle according to claim 1, wherein at least one of the first entry path projection of the first orifice and the second entry path projection of the second orifice is in intersecting relationship with the central longitudinal axis.

4. The nozzle according to claim 1, wherein at least one of the first entry path projection of the first orifice and the second entry path projection of the second orifice is in non-intersecting relationship with the central longitudinal axis.

5. The nozzle according to claim 1, wherein the first orifice configuration comprises a first cylinder with a first cylinder axis disposed at a first angle of inclination relative to the central longitudinal axis, and the second orifice configuration comprises a second cylinder with a second cylinder axis disposed at a second angle of inclination relative to the central longitudinal axis, the second angle of inclination being different from the first angle of inclination.

6. The nozzle according to claim 5, wherein the first angle of inclination and the second angle of inclination define a convergence angle therebetween, the convergence angle being an acute angle.

7. The nozzle according to claim 1, wherein at least one of the first orifice configuration and the second orifice configuration has a taper from the inner surface to the outer surface of the nozzle body.

8. The nozzle according to claim 1, wherein the first orifice configuration of the first orifice defines a first exit path projection extending from the first outer opening away from the nozzle body, and the second orifice configuration of the second orifice defines a second exit path projection extending from the second outer opening away from the nozzle body, the first exit path projection of the first orifice and the second exit path projection of the second orifice being in diverging relationship to each other moving away from the outer surface of the nozzle body.

9. The nozzle according to claim 1, wherein the outer surface defines a third outer opening and a fourth outer opening, and the inner surface defines a third inner opening and a fourth inner opening, wherein the nozzle body defines a third orifice in communication with the interior chamber and extending in a third orifice configuration between the third outer opening and the third inner opening, and the nozzle body defines a fourth orifice in communication with the interior chamber and extending in a fourth orifice configuration between the fourth outer opening and the fourth inner opening, the third orifice configuration of the third orifice defining a third entry path projection extending from the third inner opening into the interior chamber, and the fourth orifice configuration of the fourth orifice defining a fourth entry path projection extending from the fourth inner opening into the interior chamber, the third entry path projection of the third orifice and the fourth entry path projection of the fourth orifice intersecting at a second impingement region in the interior chamber, the second impingement region being radially offset in the radial plane from the central longitudinal axis and from the impingement region of the first entry path projection and the second entry path projection.

10. A fuel combustion system comprising:
   a cylinder block defining, at least partially, a main combustion chamber;
   a prechamber assembly in communication with the main combustion chamber, the prechamber assembly defining a precombustion chamber, the precombustion chamber in communication with the main combustion chamber, the prechamber assembly including a prechamber housing, an ignition device adapted to selectively ignite a fuel source disposed in the precombustion chamber, and a nozzle, the ignition device mounted to the prechamber housing, the nozzle and the prechamber housing cooperating together to define the precombustion chamber, the nozzle including:

a nozzle body, the nozzle body having a mounting end and a distal tip, the nozzle body defining a central longitudinal axis extending between the mounting end and the distal tip, the nozzle body being hollow and including an outer surface and an inner surface, the outer surface defining a first outer opening and a second outer opening, the inner surface defining a first inner opening, a second inner opening, and an interior chamber which comprises a part of the precombustion chamber, and wherein the nozzle body defines a first orifice in communication with the interior chamber and the main combustion chamber, the first orifice extending in a first orifice configuration along a first angle of inclination relative to the central longitudinal axis between the first outer opening and the first inner opening, and the nozzle body defines a second orifice in communication with the interior chamber and the main combustion chamber, the second orifice extending in a second orifice configuration along a second angle of inclination relative to the central longitudinal axis between the second outer opening and the second inner opening, the second angle of inclination being different from the first angle of inclination, the first orifice configuration of the first orifice defining a first entry path projection extending from the first inner opening into the interior chamber, and the second orifice configuration of the second orifice defining a second entry path projection extending from the second inner opening into the interior chamber, the first entry path projection of the first orifice and the second entry path projection of the second orifice intersecting at an impingement region in the interior chamber, the impingement region being radially offset from the central longitudinal axis in a radial plane substantially perpendicular to the central longitudinal axis.

11. The fuel combustion system according to claim 10, wherein the ignition device comprises a spark plug with an electrode, the spark plug removably mounted to the prechamber housing such that the electrode is in communication with the precombustion chamber and that the electrode is substantially aligned with the central longitudinal axis.

12. The fuel combustion system according to claim 10, wherein at least one of the prechamber housing and the nozzle define a fuel passage, the fuel passage in communication with the precombustion chamber and adapted to be placed in communication with a supplemental fuel source, the fuel combustion system further comprising:

a control valve adapted to selectively occlude the fuel passage to prevent a flow of fuel from the supplemental fuel source to the precombustion chamber.

13. The fuel combustion system according to claim 10, wherein the first orifice configuration of the first orifice defines a first exit path projection extending from the first outer opening away from the nozzle body, and the second orifice configuration of the second orifice defines a second exit path projection extending from the second outer opening away from the nozzle body, the first exit path projection of the first orifice and the second exit path projection of the second orifice being in diverging relationship to each other in the main combustion chamber moving away from the outer surface of the nozzle body.

14. A method of making a nozzle for a prechamber assembly of an engine, the method of making comprising:

manufacturing a nozzle body, the nozzle body having a mounting end and a distal tip, the nozzle body defining a central longitudinal axis extending between the mounting end and the distal tip, the nozzle body being hollow and including an outer surface and an inner surface, the outer surface defining a first outer opening and a second outer opening, the inner surface defining an interior chamber, a first inner opening, and a second inner opening;

defining a first orifice in communication with the interior chamber, the first orifice extending in a first orifice configuration along a first angle of inclination relative to the central longitudinal axis between the first outer opening and the first inner opening, the first orifice configuration of the first orifice defining a first entry path projection extending from the first inner opening into the interior chamber; and defining a second orifice in communication with the interior chamber, the second orifice extending in a second orifice configuration along a second angle of inclination relative to the central longitudinal axis between the second outer opening and the second inner opening, the second angle of inclination being different from the first angle of inclination, the second orifice configuration of the second orifice defining a second entry path projection extending from the second inner opening into the interior chamber;

wherein the first entry path projection of the first orifice intersects the second entry path projection of the second orifice at an impingement region in the interior chamber, the impingement region being radially offset from the central longitudinal axis in a radial plane substantially perpendicular to the central longitudinal axis.

15. The method of making according to claim 14, wherein the nozzle body is manufactured and the first orifice and the second orifice are defined via additive manufacturing.

* * * * *